United States Patent [19]

Schoening et al.

[11] Patent Number: 4,654,189
[45] Date of Patent: Mar. 31, 1987

[54] OPERATING ELEMENT CHARGING AND WITHDRAWAL IN A GAS COOLED HIGH TEMPERATURE REACTOR

[75] Inventors: Josef Schoening, Hambruecken; Fritz Schmiedel, Ketsch; Hubert Handel, Rimbach; Hans-Peter Hobrecker, Heidelberg, all of Fed. Rep. of Germany

[73] Assignee: Hochtemperatur-Reaktorbau GmbH, Fed. Rep. of Germany

[21] Appl. No.: 699,303

[22] Filed: Feb. 7, 1985

[30] Foreign Application Priority Data

Feb. 11, 1984 [DE] Fed. Rep. of Germany ....... 3404905

[51] Int. Cl.⁴ .............................................. G21C 19/20
[52] U.S. Cl. ..................................... 376/265; 376/266; 376/203; 376/250; 376/310; 376/381; 376/272
[58] Field of Search ................ 376/265, 266, 264, 203, 376/250, 381, 382, 310, 272; 221/7

[56] References Cited

U.S. PATENT DOCUMENTS

| 2,983,658 | 5/1961 | Hyman et al. | 376/265 |
|---|---|---|---|
| 3,046,212 | 7/1962 | Anderson | 376/266 |
| 3,228,850 | 1/1966 | Fellows | 376/381 |
| 3,253,738 | 5/1966 | Bromley | 376/265 |
| 3,297,248 | 1/1967 | McLearn | 221/7 |
| 3,427,220 | 2/1969 | Rennie et al. | 376/265 |
| 3,464,888 | 9/1969 | Boettcher | 376/266 |
| 3,722,674 | 3/1973 | Hoppmann et al. | 221/7 |
| 3,960,656 | 6/1976 | Lohnert et al. | 376/265 |
| 4,312,704 | 1/1982 | Schror et al. | 376/266 |

FOREIGN PATENT DOCUMENTS

| 1589532 | 6/1967 | Fed. Rep. of Germany. | |
|---|---|---|---|
| 1281046 | 6/1969 | Fed. Rep. of Germany. | |
| 6753677 | 7/1969 | Fed. Rep. of Germany. | |
| 2357426 | 7/1984 | Fed. Rep. of Germany. | |
| 0896109 | 5/1962 | United Kingdom | 376/265 |
| 1209137 | 10/1970 | United Kingdom | 376/265 |
| 1239304 | 7/1971 | United Kingdom. | |
| 1480606 | 7/1977 | United Kingdom. | |

Primary Examiner—Deborah L. Kyle
Assistant Examiner—Dan Wasil
Attorney, Agent, or Firm—Robert J. Koch

[57] ABSTRACT

A medium power, high temperature pebble bed nuclear reactor, which includes a means for introduction and withdrawal of operating elements. The installation is provided in such a way that it can be more economically built and operated. The installation includes several input stations above a prestressed concrete pressure vessel, and charging hatch blocks positioned on top of the prestressed concrete pressure vessel. The blocks include selectors through which the pebble-shaped operating elements, after traversing helical and meandering charging conduits, reach into the reactor core. The selectors and charging conduits are installed within armored ducts which penetrate the prestressed concrete pressure vessel. Similar armored ducts are provided for exit ducts for withdrawal of pebbles from the core, and a first common exit hatch block is connected to the exit ducts. The block is arranged within foundation walls which support the prestressed concrete pressure vessel. A second exit hatch block, which is connected to the first exit hatch block by a shielded exit hatch channel, is provided in a reactor protection building. The withdrawal station is arranged in a reactor auxiliary building and connected to the shielded exit hatch channel.

13 Claims, 6 Drawing Figures

OPERATING ELEMENT CHARGING AND WITHDRAWAL IN A GAS COOLED HIGH TEMPERATURE REACTOR

BACKGROUND OF THE INVENTION

1. Field of the Invention

The present invention relates to improvements in or relating to high temperature reactors. More particularly, the present invention is concerned with medium power nuclear reactors in which the primary circuit is enclosed by a prestressed concrete pressure vessel or similar prestressed concrete reactor vessel, and this is supported on foundation walls. A reactor protection building surrounds the prestressed concrete reactor vessel, and is associated with a reactor auxiliary building. The reactor includes a reactor core which is made up of a bed of spherical full elements or pebble bed, which once through the reactor core under the force of gravity, and includes a charging installation for the introduction, as well as means for the withdrawal of operating elements. The pertaining charging conduits, pellet tubes, and exit pipes, as well as functional components for closing, metering, counting, distributing, and collecting of the operating elements are associated with the charging installation. The reactor also includes armored ducts which penetrate the prestressed concrete pressure vessel.

2. Background of the Art

Feed apparatus, or similar charging installations, for nuclear power reactors of medium power in pebble bed reactors are known, such apparatus are designed in accordance with modular design principles, and contain functional components, which can be moved by drives, for the introduction, withdrawal, distribution, and sorting of fuel elements. The functional components exhibit bores for the passage of pellets, and they are set in a block, or a plate, which is respectively provided with connecting bores for the pellets. Such feed apparatus are shown in West German Utility Model No. 6,753,677; West German Auslegeschrift No. 1,589,532; and West German Offenlegungsschrift No. 2,357,426.

The feed apparatus which is described in West German Offenlegungsschrift No. 2,357,426 is used, for example, in the nuclear power plant THTR-300, in which the feed station for the operating elements, fuel pellets and pure graphite pellets, is arranged in an auxiliary building and at a lower elevation than the high temperature reactor (HTR). A central withdrawal duct is provided in this HTR for the removal of the operating elements, and the duct leads to a burn-up measuring apparatus which is arranged in the charging room beneath the prestressed concrete pressure vessel. Because the fuel pellets are passing several times through the reactor core, until they have reached the desired final degree of burn-up, such a measuring apparatus is a necessity. For the same reason, a feed device is installed in the charging room, for conveying those operating elements which can still be used to the reactor core. The device is also used for fresh operating elements. In order to prevent damage of the operating elements due to impinging on the upper surface of the pebble bed or filling, the upper ends of the feed conduits exhibit a delay or deceleration apparatus.

The state of the art further includes German Pat. No. 1,281,046 which also shows a feed apparatus for a so-called pebble bed reactor. The withdrawal and sorting device for the fuel pellets therein is also arranged beneath the reactor core and also exhibits a burn-up measuring apparatus. In accordance with the burn-up readings, the pellets are transferred again into the core, or they are separated from the cycle.

SUMMARY OF THE INVENTION

It is therefore a general object of the present invention to provide an installation for introduction and withdrawal of operating elements in a high temperature reactor of the type briefly described in the foregoing, which can be built and operated more economically than known installations.

In accordance with one aspect of the present invention these objects are attained by an installation for the introduction and for the withdrawal of operating elements which comprises:

(a) at least two input stations, with each input station being arranged within said reactor protection building and above said prestressed concrete pressure vessel; and for each input station, at least one distributor block operatively connected thereto;

(b) a plurality of charging hatch blocks, with at least two charging hatch blocks being operatively connected to a pertaining distributor block; and each charging hatch block having means for containing functional components for closing, metering, and counting, and said means being adapted to be positioned on said prestressed concrete pressure vessel ceiling; and means operatively connected within a corresponding armored duct, said means including a selector, and charging conduits operatively connected thereto;

(c) said charging conduits being shaped as helical conduits, and each charging conduit being adapted to be followed beneath said prestressed concrete pressure vessel ceiling by at least one inlet pipe which is adapted to be disposed in a random or meandering configuration;

(d) a plurality of exit conduits, discharge separators, and singularizers, with pertaining exit conduits being operatively connected in said prestressed concrete pressure vessel bottom to pertaining ones of said armored ducts, and wherein in each pertaining exit pipe a pertaining scrap separator is operatively connected to at least one pertaining singularizer;

(e) a first exit hatch block arranged outside of said prestressed concrete pressure vessel and within said foundation walls, said first exit hatch block being connected to a pertaining scrap separator and a shielded exit hatch channel, said channel being adapted to pass through said reactor protection building, and said first exit hatch block being adapted to contain functional components for shutoff and counting;

(f) a second exit hatch block arranged outside of said foundation walls and inside said reactor protection building, and adapted to be operatively connected to said exit hatch channel and at least one exit station operatively arranged in said reactor auxiliary building, said second exit hatch block being adapted to contain functional components for metering, counting, and shutoff; and (g) wherein pertaining charging hatch blocks and said first exit hatch block are respectively equipped with closing devices, said devices being of at least two different configuration types, whereby for charging and withdrawal operations standard devices are used, and for isolating/closing of the primary cycle, for the control of the non-standard conditions, special devices are used.

In accordance with the present invention, several important advantages are gained in such high temperature reactor with charging installation for introduction and withdrawal of operating elements. Thus, a delay or deceleration apparatus for operating elements is obviated at the entry into the reactor core, due to the particular configuration of the various charging and inlet pipes and the conduits. The utilization of selection switches allows the reduction in number of required functional components. The mechanical elements of the selection switches, as well as the elements of the combined singularizers/scrap separators, are integrated in a practical manner in the prestressed concrete pressure vessel because they are interiorly arranged in armored duct passages, in such a way that problems generally do not arise during charging, or similar feeding operations, and during removal operations with respect to the sealing of the primary circuit.

The first exit hatch block, for one is arranged below the pertaining level of the prestressed concrete pressure vessel and, accordingly, is easily accessed. It is also located within the space enclosed by thick foundation walls, and these provide a shield for it at the same time. The input stations are also installed outside of the prestressed concrete pressure vessel, such that a simple pipe compensation is possible for the succeeding pebble tubes and similar ducts. The conduits which are subjected to pressure during normal operation are arranged within the reactor protection building.

Of particular advantage is the utilization of various shutoff devices at the functional components. For operational charging and withdrawal sequences or procedures, one can use armatures and similar equipment, for example, ball cocks, ball valves, and the like. These close the charging hatch portion at the commencement in the distributor blocks and at the terminus in the charging blocks. In the case of incorrect start-up, or in the case of failure of one of these armatures, gas in the hatch is set free and passes into the reactor protection building because the entire input assembly is arranged in this building.

Further standard armatures are adapted to close the exit hatch stretch between the first and the second exit hatch block. In the latter is done the withdrawal of the operating elements from the reactor protection building into the reactor auxiliary building in which the exit station is disposed. When gas is set free into the reactor auxiliary building, due to control errors or due to failure of an armature, only the contents of a hatch is released.

All pebble tubes which lead out of the prestressed concrete pressure vessel are adapted to be directly closed by special armatures at the interface locations of pertaining passages through the pertaining vessel walls, for example, double-seat closing armatures and similar shutoff valves. These armatures ensure the safe isolation of the primary circuit even in the case of disruptive situations, they are designed in accordance with disruption-incident requirements and similar fail-safe considerations, and they are arranged within the charging hatch locks and in the first exit hatch block. The configuration of all components which follow in line behind the special armature, beginning at the prestressed concrete pressure vessel, is done in accordance with the operational requirements.

The German Patent Application No. P 3,344,527.3 describes a high temperature reactor in which the charging installation for introduction and withdrawal of operating elements can be used. The subject matter of this application is incorporated herein.

DESCRIPTION OF THE DRAWING

The above and other objects, features and advantages will become apparent from the following description, reference being made to the accompanying drawing in which there are illustrated preferred embodiments of the invention. In the drawing.

SPECIFIC DESCRIPTION

Figure 1:
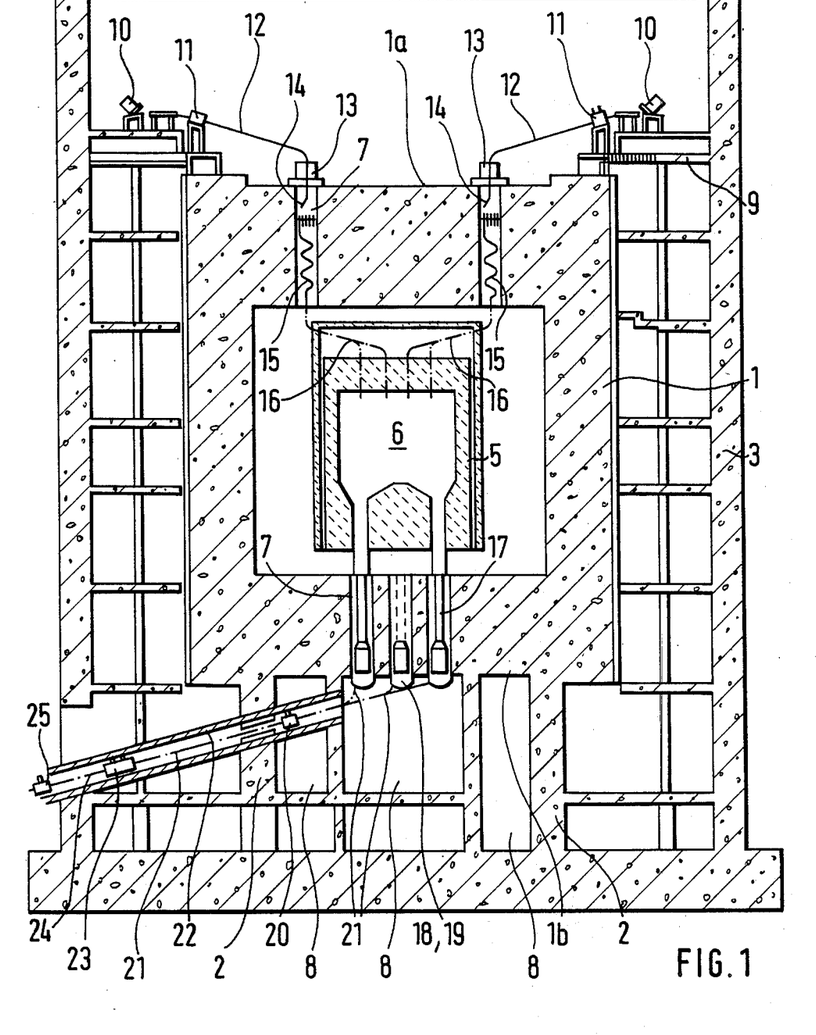
FIG. 1 is a longitudinal cross section through the high temperature reactor according to line A - B of FIG. 2.
Figure 2:
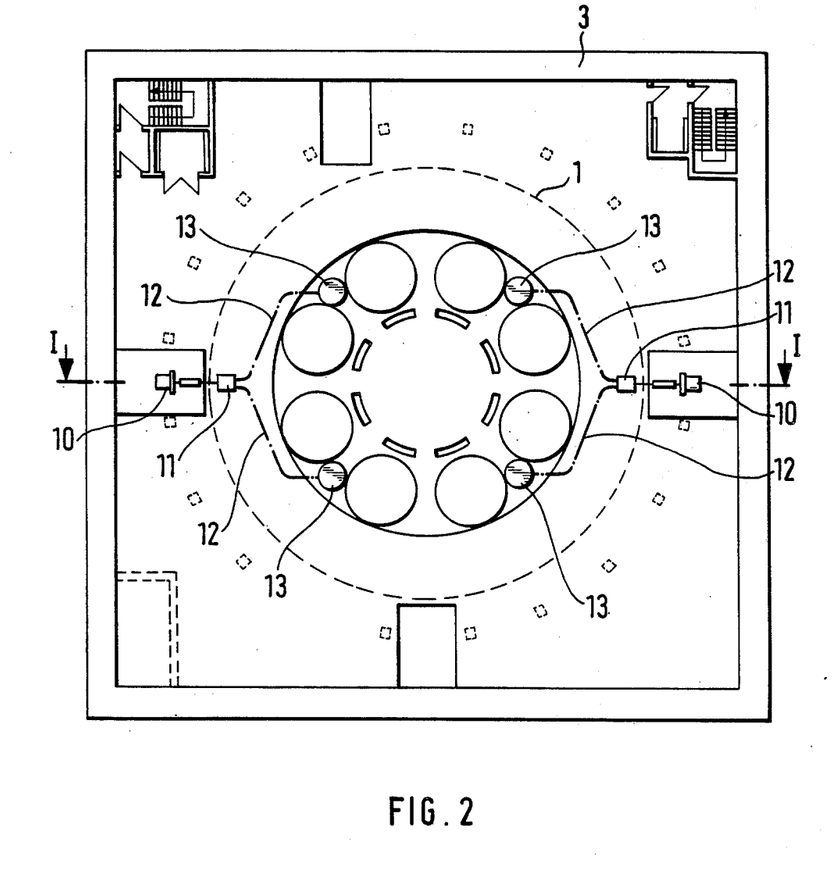
FIG. 2 is a horizontal view of the high temperature reactor above the prestressed concrete pressure vessel.
Figure 3:
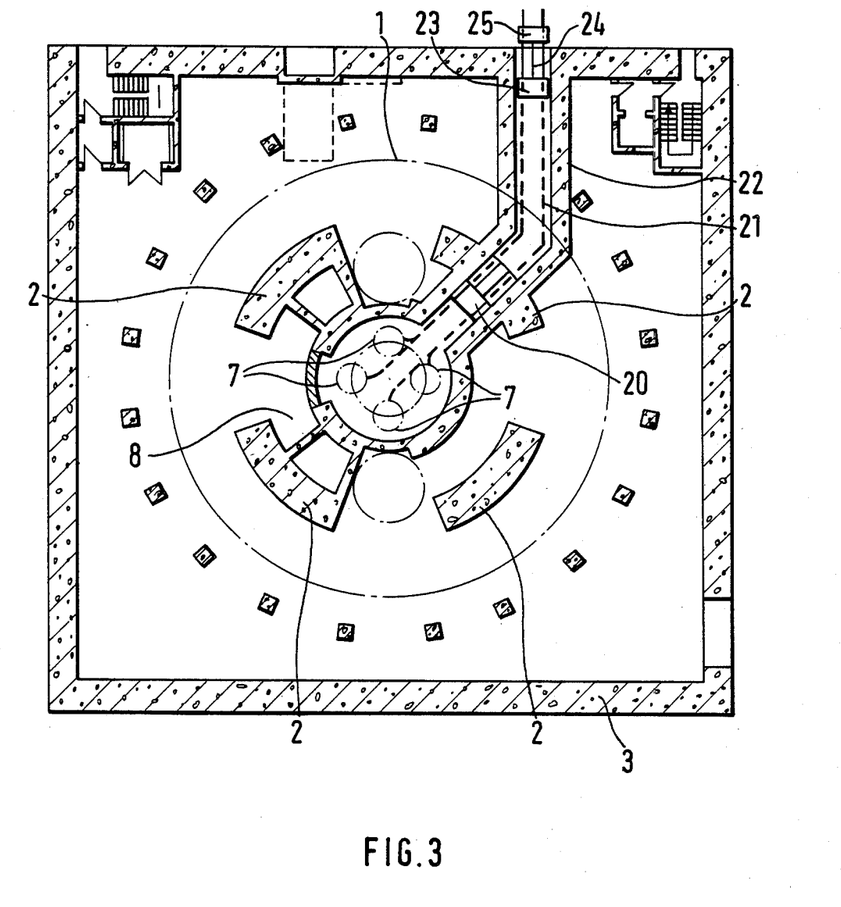
FIG. 3 is a horizontal view of the high temperature reactor beneath the prestressed concrete pressure vessel.

The entire reactor installation is shown in FIGS. 1, 2, and 3.

Figure 6:
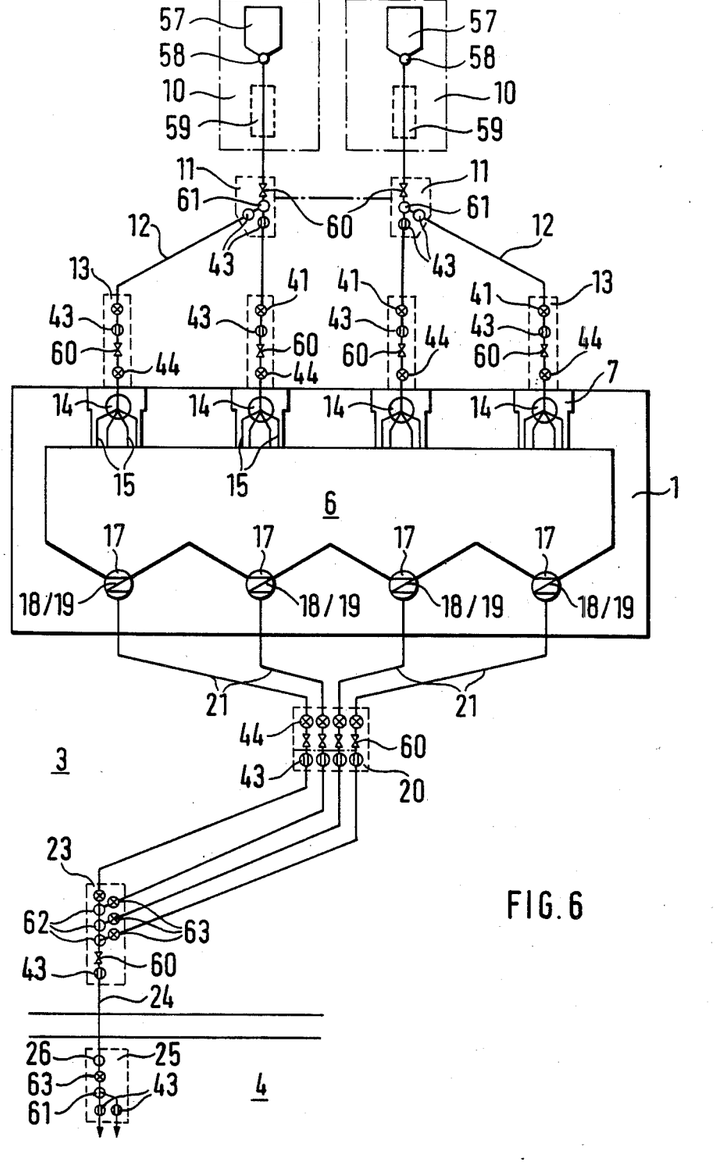
FIG. 6 shows a schematic flow sequence of the charging and withdrawal operations.

FIG. 1 shows the prestressed concrete pressure vessel 1 with a ceiling 1a and a bottom 1b. This prestressed concrete pressure vessel, also referred to as prestressed concrete reactor vessel in the art, is supported on foundation walls 2. The foundation walls 2, which have the shape of ring segments, enclose a space 8. The prestressed concrete pressure vessel 1 is surrounded on all sides by a reactor protection building 3 at which follows, as is schematically indicated in FIG. 6, a reactor auxiliary building 4. Between the reactor protection building 3 and the prestressed concrete pressure vessel 1 there is arranged a structure of several superimposed platforms, and the uppermost platform 9 is arranged above the ceiling or top 1a. Several armored ducts 7, or similar conduits, are inserted in passages in the prestressed concrete pressure vessel ceiling 1a as well as in the prestressed concrete pressure vessel bottom 1b.

In the prestressed concrete pressure vessel 1 is arranged a high temperature reactor 5 which has a power of 300 to 600 MWe. Its core is composed of a filling 6 of pebble-shaped operating elements, fuel elements and pure graphite elements, which pass through the filling or core 6 under the influence of gravity. The core is divided into two zones of specific fuel content. The charging or feeding operation is done in such a way that the fuel elements have reached their final burn-up condition after a single pass through the core 6.

For charging the high temperature reactor 5 with the operating elements, a charging assembly composed of many elements is envisaged which is described in detail in the following in conjunction with FIGS. 1, 2, and 3.

On the uppermost platform 9 are arranged two diametrically opposing feeder stations or input stations 10, at each of which is connected a distributor block 11; in this the pellet conduits are separated into two strands or lines, see FIG. 2, which serve as buffer zones 12. Each buffer stretch or zone 12 leads with a slope to the charging gate or charging hatch block 13; and there are, accordingly, provided altogether four such charging hatch blocks 13 or similar gate or lock means.

Figure 4:
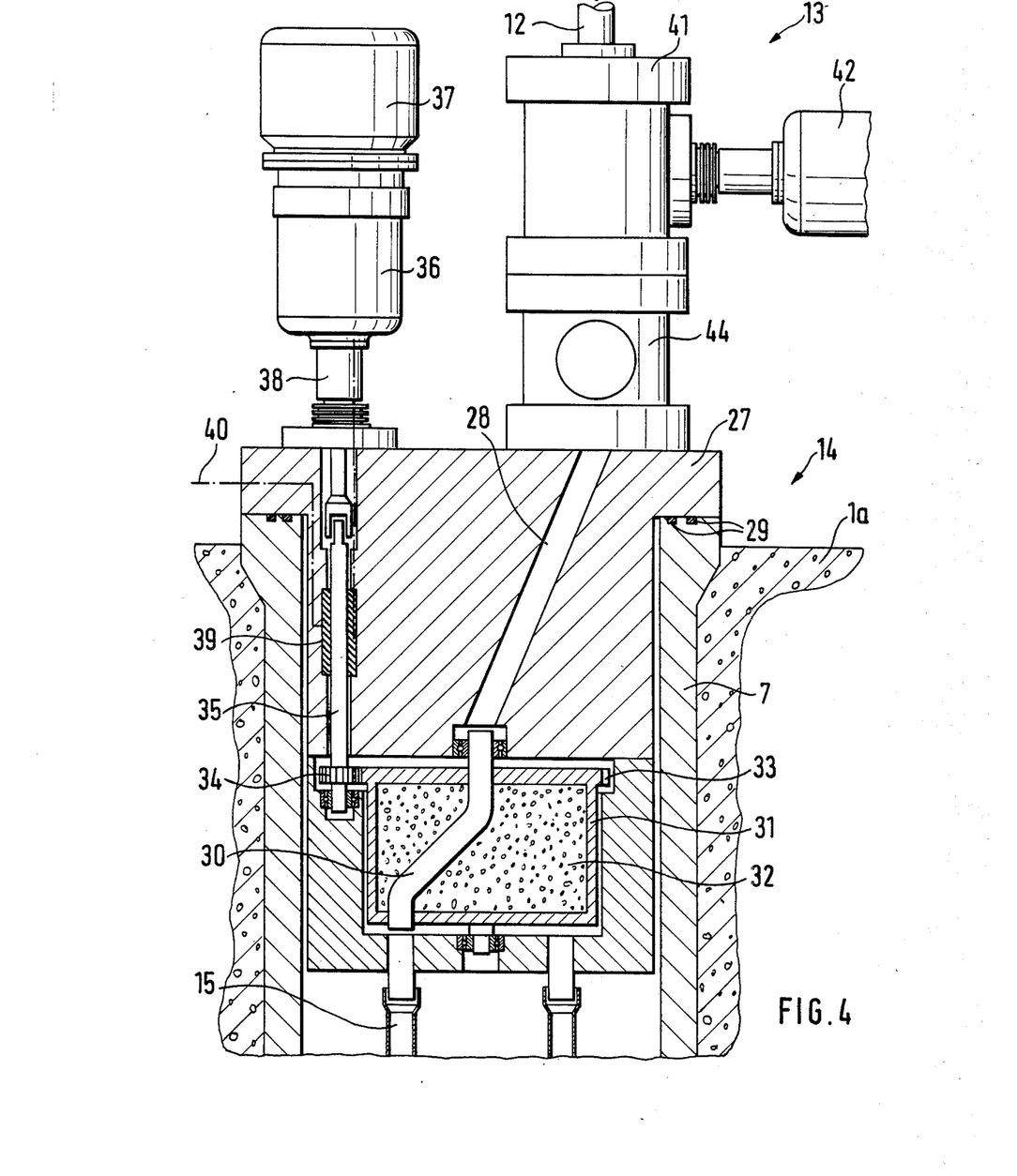
FIG. 4 shows a selector in longitudinal cross section.

The charging hatch blocks 13 include, respectively, an upper part, which contains functional components for closing, metering, and counting, compare FIG. 6, as well as a lower part which is formed by a multiple gate, selection switch or selector 14, and charging conduits 15, shown in detail in FIG. 4, connected thereto. The upper part of a charging hatch block 13 is supported on the ceiling or top 1a of the prestressed concrete pressure vessel, whereas the lower part is respectively installed within an armored duct 7, or similar lined conduit or passage. The charging conduits 15 are shaped as helical flights, or in a similar screw manner, in order to decelerate pellets running through them. For the same reason the inlet pipes 16, which are connected to the charging conduits 15 and serve for transporting pellets within the prestressed concrete pressure vessel 1 to the pebble bed, or pile, or core 6, are disposed in random non-straight fashion. Such measures obviate a separate decelerating or braking device for the operating elements.

For removal of the operating elements from the core 6 there are provided four exit ducts 17, or similar conduits or passages, which, respectively, lead through armored ducts 7 out of the prestressed concrete pressure vessel 1. Still within the prestressed concrete pressure vessel 1, in each exit duct 17 there is installed a scrap separator 19 which is combined with a so-called singulizer or singularizer 18, shown in detail in FIG. 5. The singularizers and the scrap separators are installed so as to extend in the vertical position.

Outside of the prestressed concrete pressure vessel 1, between the foundation walls 2 which simultaneously serve as shields, a first exit hatch or block 20, or similar lock, is arranged, in which, in turn, are arranged functional components for closing, and counting, compare FIG. 6. All four first element tubes 21, or similar conduits or passages, which lead from the scrap separators 19, enter into this first exit hatch block 20. The tubes continue following the exit hatch block 20 in a shielded channel 22 which traverses the reactor protection building 3.

A second exit hatch block 23, or similar lock, is provided immediately in front of the wall of the reactor protection building 3 in the shielded channel 22. The second exit hatch block 23 contains functional components for metering, counting and closing, as well as a plurality of collectors which combine or gather the pebble tubes 21 into a second pebble tube 24, compare FIG. 6, which tubes up to this point were positioned parallel with respect to one another. Operating elements are transported to a withdrawal or exit station 25 in this second pebble tube 24. The exit station 25 is located in the reactor auxiliary building 4, and it comprises a gamma distinguishing and/or measuring apparatus, or similar radiation monitoring and/or reporting device, generally identified by the reference numeral 26, with the aid of which the graphitic or graphite elements are separated from the fuel elements. A burn-up determination of the fuel elements is not made because they have reached their burn-up condition. The fuel elements are loaded, by means of a device mounted by way of flanges, not shown, into containers, for example, drums, not shown. The graphite elements are stored in a graphite storage.

FIG. 4 shows an enlarged representation of a multiway gate, selection switch, or selector 14 as part of a charging hatch block 13. The selector or switch 14 is installed in an armored duct 7 which passes through the ceiling or top 1a of the prestressed concrete pressure vessel 1. The armored duct 7 is closed by a shield plug 27 which has a pebble passage 28. Two annular seals 29 are provided at the contact or interface location of the armored duct 7 and the shield plug 27. A rotatable gate, switch or selector 30, in the form of a bent tube, is provided at the upper end at the pebble passage 28 and beneath the shield plug 27. The lower end of this pipe or tube can selectively be brought into connection with one of the charging conduits 15 which are passed through the armored duct 7. The connection is achieved by rotation of the lower end of the tube which forms the switch or selector 30.

The selector 30 is arranged in a housing 31 which is filled with shielding material 32, and the housing 31 is provided with a ring gear or similar spur gear 33 at its upper circumference. This gear 33 is in engagement with the gear wheel 34 which is powered or rotated by an electric motor 37, via a shaft 35 which extends through the shield plug 27, and via a stepping transmission 36, the selector 30 is moved by a further departing, delivery or unloading position. The transmission ratio of the integrated transmission step is preferably 1:n, when n is the number of the pertaining charging conduits 15. A gastight shaft passage member 38 is arranged between the transmission 36 and the shield plug 27.

The drive components are easily maintained because they are arranged outside of the prestressed pressure vessel 1. For maintenance purposes, the shaft passage member 38, which is prone to become worn, when the reactor is under operating pressure, or when taking it out, respectively, a stationary seal 39 is provided within the shield plug 27 and about the shaft 35. This seal 39 assumes its sealing position or condition prior to taking out the shaft passage member 38. By means of a leak control system 40 the effectiveness of the stationery seal 39 can be examined. The inteface room or space between the two seals 29 is also connected at the leak control 40.

The upper part of the charging hatch block 13 is set on the shield plug 27. The terminus of a pebble-guiding buffer stretch or zone 12 can be seen, and this is followed by a metering apparatus 41, which is adapted to simultaneously perform the functions of a pressure gate, lock, or similar closing means. Such a pressure gate or lock has the purpose, during operational problems, to limit or constrict the cross section of the pebble tube. The metering apparatus 41 is powered or driven by a drive assembly 42. The metering apparatus 41 is followed by a counter 43, compare FIG. 6. As further functional component, the charging hatch block 13 also comprises two closing armatures or similar valves, valve means or devices, of which the lower one, designated by reference numeral 44, is formed as special armature. Further details of this are disclosed in the specific description of FIG. 6.

Figure 5:
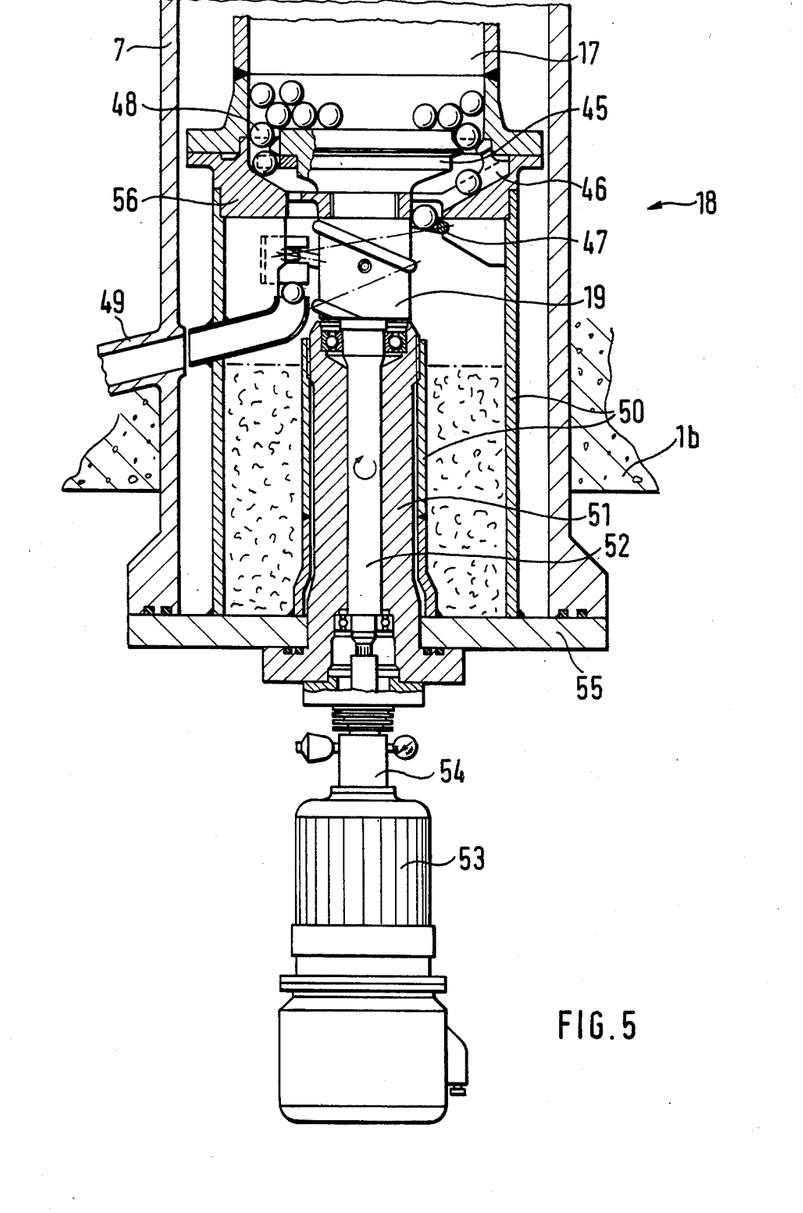
FIG. 5 shows a scrap separator in combination with a singularizer in longitudinal cross section.

The combination of a scrap separator 19 with a so-called singulizer or singularizer 18 is shown in a larger scale in FIG. 5. The singularizer 18 is shown in a larger scale in FIG. 5. The singularizer 18 is composed of a disc 45, which cannot be taken out and which is installed in such a way so as to be able to rotate. The disc 45 includes a guide plane 46 for the passage or exit of pebbles, and the lower part of the guide plane 46 is worked into a rigid or fixed support 56. The disc 45 is directly installed beneath the exit ducts 17 in the armored duct 7. At the disc 45 there follows a vertically installed helical passage member 47, and the individual pebbles 48 pass through this passage member 47. Consequently, pebbles which are not damaged pass through the helical passage member 47 and reach the exit conduit 49 which, via one of the fuel element tubes 21, is in operative communication with the first exit hatch block 20.

Spent operating elements or scrap pieces falling from the helical passage 47, and dust particles, reach a container 50 which is formed by two concentrically arranged metallic cylinders. A shield plug 51 and a drive shaft 52 are arranged within the inner cylinder. The drive shaft 52 serves as a common drive means for the singularizer disc 45 and the helical passage member 47. The drive shaft 52 is, in turn, powered by a geared motor 53. The shaft entry into the shield plug 51 is sealed by means of a gastight shaft passage 54, or similar passage member. The armored duct 7 is closed by a cover 55 which forms the pressure vessel terminus. Just like the shaft 35 of the selector 14, FIG. 4, the drive shaft 52 is the scrap separator/singularizer is also equiped with a stationary seal. (Not shown.)

FIG. 6 shows schematically the charging sequence. For the details already shown in FIGS. 1 to 4, the same reference numerals apply.

The charging sequence commences in the two input stations 10 which are arranged above the prestressed concrete pressure vessel 1, and drums 57 with fresh operating elements are placed at the input stations 10. Via the singularizer 58 the operating elements of each station initially reach an inspection station 59, or a withdrawal point for taking samples, and they then enter into the distributor blocks 11, each of which includes a standard closing armature or similar valve or valve means 60, hereinafter also referred to as plant armature, or generally as device, a selector 61, and two counters 43. The two distributor blocks 11 can be connected to a relief system, not shown.

From the two selectors 61 divided into four strands or lines, the operating elements, via four buffer zones or stretches 12, reach the charging hatch blocks 13. These are respectively equipped with a metering apparatus 41 which serves as a pressure lock, a counter 43, a plant armature, valve or similar device 60, and a special armature, valve or device 44. In the selector 14 the four pebble streams are further divided, initially enter into the charging conduits 15, and are introduced through the inlet pipes 16, not shown here, into the reactor core 6.

The operating elements are withdrawn, through the four exit ducts 17, in each of which is installed a combination of a singularizer 18 and scrap separator 19, from the core filling, and are passed through the first pebble tubes 21 to the first exit hatch block 20. Relief and flushing or rinsing systems, both not shown, are connected to the exit hatch block 20 and such are also connected to the second exit hatch block 23. The exit hatch block 20 has four pebble passages, and a plant armature, or similar special armature or device 60, and a counter 43 are arranged in each pebble passage.

The pebble tubes 21 extend next in the shielded channel 22, FIGS. 1 and 3, and enter into the second exit hatch block 23, which is still located in the reactor protection building 3. This exit hatch block 23 serves again also as collector block and, accordingly, exhibits—aside from metering apparatus 66—a number of collectors 62 which gather together pebble ducts or strands to form a pebble tube 24. Furthermore, the second exit hatch block 23 contains a plant armature or device 60, and a counter 43.

The pebble tube 24 leaves the reactor protection building 3, enters the reactor auxiliary building 4, and has its terminus in the exit station 25. The exit station is equipped with the gamma distinguishing and/or measuring apparatus 26, a metering apparatus 63, and a switch, gate or similar selector 61. By means of the selector 61, the sorted fuel elements and graphitic elements are separated into two different conduits each of which has a counter 43.

As can be seen in FIG. 6, all pebble conduits emanating from the prestressed concrete pressure vessel 1 are equipped with special armatures or similar valve means or devices 44. As such armatures one can utilize, for example, double-seat closing armatures or valves. Such armatures are designed in accordance with disruption-incident requirements. For the controlled operational input and exit sequences, standard or plant armatures 60 are contemplated, for example, ball cocks or ball valves. Special armatures or devices 44 are located in the input or charging hatch blocks 13 as well as in the first exit hatch block 20, immediately on that side which is directed towards the prestressed concrete pressure vessel 1.

Reference in this disclosure to details of the specific embodiments is not intended to restrict the scope of the appended claims, which themselves recite those features regarded as essential to the invention.

What is claimed is:

1. A medium power, high temperature nuclear power reactor, said reactor comprising:
   a primary circuit arrangement for heating a gaseous substance, said primary circuit arrangement including:
   a prestressed concrete pressure vessel, said prestressed concrete pressure vessel having a bottom, and having a top remote from said bottom;
   foundation walls for supporting said prestressed concrete pressure vessel;
   a reactor protection building surrounding said prestressed vessel;
   a reactor auxiliary building in communication with said protection building;
   a pebble bed reactor core within said prestressed concrete pressure vessel, said pebble bed reactor core comprising operating elements being adapted to be passed once through said reactor core by force of gravity;
   means for introduction of said operating elements and withdrawing said operating elements, said means including charging conduits, first and second pebble tubes, exit conduits, and functional components for closing, metering, counting, distributing, and collecting of operating elements; and
   a plurality of armored ducts, each duct being arranged in such a way so as to operatively penetrate said prestressed concrete reactor vessel;
   means for introducing and withdrawing operating elements including:
   (a) at least two input stations, with each input station being arranged within said reactor protection building and above said prestressed concrete pressure vessel; and
   for each input station, at least one distributor block operatively connected thereto for distributing said operating elements;
   (b) a plurality of charging hatch blocks, with at least two charging hatch blocks being operatively connected to a corresponding distributor block, and each charging hatch block having means for containing functional components for closing, metering, and counting, said operating elements and said means being adapted to be positioned on said prestressed concrete pressure vessel ceiling; and means operatively connected within a corresponding armored duct for selecting; gating, and changing said operating elements, said means including charging conduits of helical shape and adapted to be followed beneath said prestressed concrete pressure vessel ceiling by at least one inlet conduit disposed in a non-straight configuration;

(c) a plurality of exit conduits, scrap separators, and singularizers, with corresponding exit conduits being operatively connected in said prestressed concrete pressure vessel bottom to corresponding conduits in said armored ducts;

(d) a first exit hatch block arranged outside of said prestressed concrete pressure vessel and within said foundation walls, said first exit hatch block connected to a corresponding scrap separator and a shielded exit hatch channel, said channel being adapted to pass through said reactor protection building, and said first exit hatch block being adapted to contain functional components for shut-off and counting; and (e) a second exit hatch block arranged outside of said foundation walls and inside said reactor protection building, and operatively connected to said exit hatch channel and at least one exit station operatively arranged in said reactor auxiliary building, said second exit hatch block being adapted to contain functional components for metering, counting, and shutoff.

2. A reactor according to claim 1 further comprising means for closing said charging hatch blocks and said first exit hatch block, said means being of at least two different configuration types, whereby a first configuration is used for operational charging and withdrawal operations and a second configuration is used for isolating/closing of the primary circuit, for control of non-standard conditions.

3. A reactor according to claim 2, and further comprising:

operating element buffer zones operatively connected between one of said input stations and one of said charging hatch blocks; and means for the constriction of the cross section of a pebble conduit installed in said operating element buffer zone.

4. A reactor according to claim 2, further comprising drive means for imparting motive power at least to said movable functional components of said charging hatch blocks, singularizers, and to scrap separators; said drive means being disposed outside said prestressed concrete pressure vessel in such a way so as to being easily accessible.

5. A reactor according to claim 4, wherein at least one drive means is equipped with at least one stationary seal.

6. A reactor according to claim 2, further comprising a charging level-determination apparatus for accounting of the number of operating elements present in said core.

7. A reactor according to claim 2, further comprising for at least one input station, at least one of the group including means for inspecting and means for taking random samples of said operating elements.

8. A reactor according to claim 2, further comprising a plurality of relief systems and a plurality of rinsing systems operatively connected to said means for introduction and withdrawal of operating elements.

9. A reactor according to claim 2, wherein several first parallel pebble tubes are adapted to be passed from said first exit hatch block, through said shielded exit hatch channel, to said second exit hatch block;

and comprising further functional components and a corresponding number of collectors adapted to be contained in said second exit hatch block.

10. A reactor according to claim 2, wherein said second exit hatch block is connected to said exit station by a singly executed pebble tube, and further comprising a gamma distinguishing and/or measuring apparatus for sorting pure graphite elements, said apparatus being adapted to be positioned within said exit station.

11. A reactor according to claim 2, wherein at least one second pebble tube is divided into singularizer disc, and a flanging device for drums for storing fuel elements.

12. A reactor according to claim 2, further comprising:

at least one shield plug adapted to close one of said armored ducts, and being equipped with at least one operating element passage;

a rotary selector operatively connected beneath said at least one shield plug;

a gear transmission operatively connected to said rotary selector for rotating it;

a motor and stepping transmission assembly for imparting motive power to said gear transmission and operatively connected thereto; and at least one gastight shaft passage member operatively connected to said shield plug.

13. A reactor according to claim 12, wherein each combination of scrap separator and singularizer is equipped with at least one singularizer disc, said at least one singularizer disc being adapted to be installed in such a way that it has at least one axis extending in vertical attitude;

a helical passage member operatively connected to said at least one singularizer disc in such a way that it can be removed and has at least one axis extending in vertical direction;

a drive motor for imparting motive power to at least one of helical passage member and singularizer disc;

a shield plug operatively connected to said armored duct;

a drive shaft operatively connected to said drive motor and adapted to be guided in said shield plug; and a container for receiving dust and spent operating elements, said container being adapted to surround said shield plug.

* * * * *